US012296797B2

(12) United States Patent
Kubik et al.

(10) Patent No.: US 12,296,797 B2
(45) Date of Patent: May 13, 2025

(54) MOTOR VEHICLES AND METHODS FOR OPERATING MOTOR VEHICLES

(71) Applicant: Ford Global Technologies, LLC, Dearborn, MI (US)

(72) Inventors: Lowell Kubik, Sterling Heights, MI (US); Thomas Svensson, Leichlingen (DE); Chad Michael Korte, Grosse Ile, MI (US); Kenneth Mchugh, Canton, MI (US); Erik Wickop, Hamburg (DE)

(73) Assignee: Ford Global Technologies, LLC, Dearborn, MI (US)

(*) Notice: Subject to any disclaimer, the term of this patent is extended or adjusted under 35 U.S.C. 154(b) by 719 days.

(21) Appl. No.: 17/205,930

(22) Filed: Mar. 18, 2021

(65) Prior Publication Data

US 2021/0291799 A1  Sep. 23, 2021

(30) Foreign Application Priority Data

Mar. 19, 2020 (DE) .......................... 102020107548.0

(51) Int. Cl.
*B60T 13/74* (2006.01)
*B60T 7/10* (2006.01)
*B60T 8/88* (2006.01)

(52) U.S. Cl.
CPC ............ *B60T 13/741* (2013.01); *B60T 7/107* (2013.01); *B60T 8/885* (2013.01)

(58) Field of Classification Search
CPC ......... B60T 13/741; B60T 7/107; B60T 8/885
USPC ........................................................ 701/70
See application file for complete search history.

(56) References Cited

U.S. PATENT DOCUMENTS

| 5,125,483 A * | 6/1992 | Kitagawa | B60T 13/741 188/1.11 R |
|---|---|---|---|
| 6,969,127 B2 * | 11/2005 | Suzuki | B60T 13/741 303/20 |
| 8,112,213 B2 * | 2/2012 | Cahill | B60T 8/1703 701/16 |
| 8,651,588 B2 * | 2/2014 | Bensch | B60T 8/327 303/7 |
| 8,752,908 B2 * | 6/2014 | Heise | B60T 13/746 303/122.04 |
| 9,039,102 B2 * | 5/2015 | Cahill | B60T 7/12 303/126 |
| 9,187,068 B2 * | 11/2015 | Vernacchia | B60T 7/122 |
| 9,428,159 B2 * | 8/2016 | Heise | B60T 13/746 |
| 9,873,414 B2 * | 1/2018 | Förster | B60T 7/122 |
| 10,532,724 B2 * | 1/2020 | Rebholz-Goldmann | B60T 17/18 |
| 11,597,392 B2 * | 3/2023 | Pursifull | B62D 7/146 |

(Continued)

FOREIGN PATENT DOCUMENTS

KR  101298138 X  8/2013

*Primary Examiner* — Kurt Philip Liethen
*Assistant Examiner* — John D Bailey
(74) *Attorney, Agent, or Firm* — Lorne Forsythe; Hanley, Flight & Zimmerman, LLC

(57) ABSTRACT

Motor vehicles and methods for operating motor vehicles are disclosed herein. An example motor vehicle includes an electric drive, an electrical brake including one or more braking actuators, a drive controller communicatively coupled to the electric drive and the electrical brake, and a brake controller communicatively coupled to the electrical brake. The drive controller is to cause the one or more braking actuators to actuate in response to a signal indicating a failure of the brake controller.

19 Claims, 5 Drawing Sheets

(56) References Cited

U.S. PATENT DOCUMENTS

| | | | |
|---|---|---|---|
| 2004/0090112 A1* | 5/2004 | Tachiiri | B60T 7/107 303/20 |
| 2004/0201270 A1* | 10/2004 | Suzuki | B60T 13/741 303/20 |
| 2006/0197374 A1* | 9/2006 | Jez | B60T 13/74 303/20 |
| 2007/0170775 A1* | 7/2007 | Uchimura | B60T 7/107 303/112 |
| 2008/0053760 A1* | 3/2008 | Oikawa | F16D 65/18 188/72.4 |
| 2010/0276988 A1* | 11/2010 | Cahill | B60T 8/885 303/20 |
| 2011/0040466 A1* | 2/2011 | Hill | B60T 8/885 701/74 |
| 2011/0272225 A1* | 11/2011 | Febrer | B60T 13/746 188/114 |
| 2012/0161508 A1* | 6/2012 | Beever | G07F 17/24 303/191 |
| 2013/0060412 A1* | 3/2013 | Nakagawara | B60T 17/221 701/22 |
| 2013/0268171 A1* | 10/2013 | Huls | B60T 1/062 701/70 |
| 2013/0282249 A1* | 10/2013 | Heise | B60T 13/746 701/70 |
| 2014/0117750 A1* | 5/2014 | McCann | B60T 8/327 303/119.1 |
| 2014/0188359 A1* | 7/2014 | Chen | B60T 13/46 701/70 |
| 2014/0214269 A1* | 7/2014 | Knechtges | B60T 13/741 701/34.4 |
| 2014/0372004 A1* | 12/2014 | Kinoshita | B60T 7/122 701/70 |
| 2015/0120163 A1* | 4/2015 | Ohara | B60T 7/108 701/70 |
| 2016/0032993 A1* | 2/2016 | Takei | F16D 65/18 188/162 |
| 2016/0052494 A1* | 2/2016 | Yamamoto | B60T 8/4872 701/70 |
| 2016/0207510 A1* | 7/2016 | Hauber | B60T 8/17 |
| 2016/0244035 A1* | 8/2016 | Yasui | B60T 7/122 |
| 2016/0339888 A1* | 11/2016 | Yokoyama | F16D 65/18 |
| 2017/0137008 A1* | 5/2017 | Takase | B60T 13/142 |
| 2017/0197605 A1* | 7/2017 | Wako | B60T 17/18 |
| 2018/0073585 A1* | 3/2018 | Masuda | F16D 55/226 |
| 2018/0229610 A1* | 8/2018 | Lian | B60T 7/042 |
| 2019/0193707 A1* | 6/2019 | Deljosevic | B60T 7/105 |
| 2020/0023823 A1* | 1/2020 | Baehrle-Miller | B60T 8/321 |
| 2020/0055506 A1* | 2/2020 | Michels | B60T 13/74 |
| 2021/0009102 A1* | 1/2021 | Nakayama | B60T 8/885 |
| 2021/0162971 A1* | 6/2021 | Brenn | B60T 13/58 |
| 2021/0171062 A1* | 6/2021 | Hecker | B60W 60/0015 |
| 2022/0118979 A1* | 4/2022 | Pursifull | B62D 15/00 |
| 2023/0256947 A1* | 8/2023 | van Thiel | B60T 13/662 303/14 |
| 2023/0278535 A1* | 9/2023 | Marx | B60T 7/107 188/106 P |

\* cited by examiner

MOTOR VEHICLES AND METHODS FOR OPERATING MOTOR VEHICLES

RELATED APPLICATION

This patent claims priority from German Patent Application No. DE 10 2020 107 548.0, which was filed on Mar. 19, 2020, and is hereby incorporated herein by reference in its entirety.

FIELD OF DISCLOSURE

This disclosure relates to motor vehicles and methods for operating motor vehicles.

BACKGROUND

A motor vehicle having an automatic transmission includes means for securing the motor vehicle in a parked position. The securing means can include an actuatable parking pawl. The motor vehicle can also include an electrical parking brake to assist the securing means in safeguarding the parked position.

SUMMARY

An example motor vehicle includes an electric drive, an electrical brake including one or more braking actuators, a drive controller communicatively coupled to the electric drive and the electrical brake, and a brake controller communicatively coupled to the electrical brake. The drive controller is to cause the one or more braking actuators to actuate in response to a signal indicating a failure of the brake controller.

Another example motor vehicle includes an electrical drive, an electrical brake, a drive controller in communication with electrical drive to generate a first instruction to cause the electrical drive to actuate, and a brake controller. Each of the drive controller and the brake controller is in communication with the electrical brake. The drive controller is to selectively generate a second instruction to cause the electrical brake to actuate.

An example method includes causing, via an electrical drive controller of a motor vehicle, an electrical drive of the motor vehicle to actuate and causing, via the electrical drive controller, an electrical brake of the motor vehicle to actuate in response to a signal output by a sensor of the motor vehicle, the signal indicative of a failure event at a brake controller of the motor vehicle.

BRIEF DESCRIPTION OF THE DRAWINGS

The figures are not to scale. In general, the same reference numbers will be used throughout the drawing(s) and accompanying written description to refer to the same or like parts.

Figure 1:
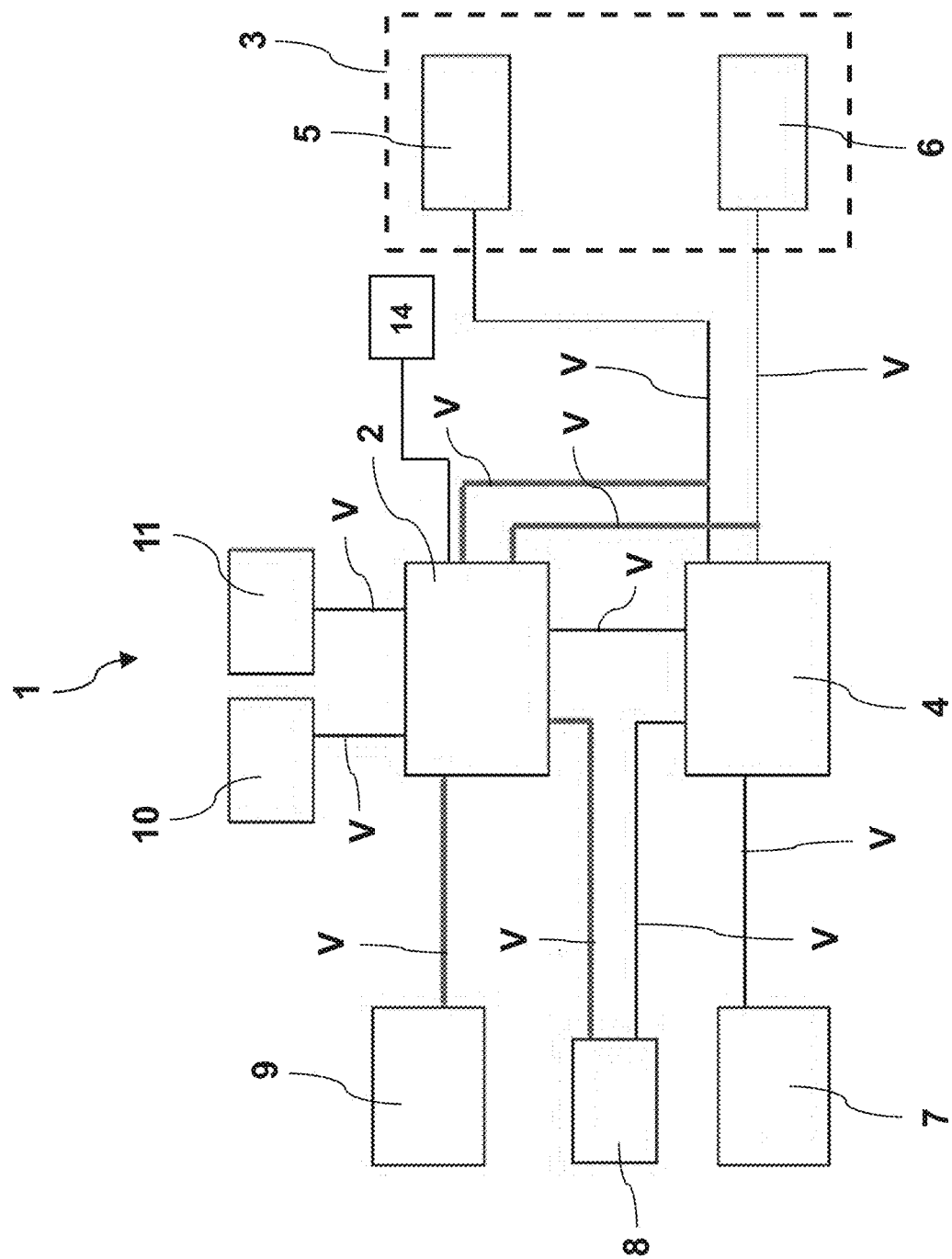
FIG. 1 is a block diagram of an example motor vehicle in accordance with teachings of this disclosure.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

A known motor vehicle having an automatic transmission includes, as the main means for securing the motor vehicle in a parked position, an actuatable parking pawl. The motor vehicle can also include an electrical parking brake to assist the securing means in safeguarding the parked position. The use of a parking pawl results in an increase in production costs and vehicle weight, which is disadvantageous, particularly for motor vehicles that are electrically drivable (i.e., electrically propelled).

Examples disclosed herein provide for an electrically drivable motor vehicle that can be produced more cost-effectively, at lighter weight, and with lower overall complexity than known motor vehicles. Example motor vehicles disclosed herein include at least one electric drive, at least one drive control module to activate the electric drive, at least one electrical parking brake, and at least one brake module to activate the parking brake in response to a parking request signal. In examples disclosed herein, a parking operation request is received and a parking request signal associated with the parking operation request is generated and transmitted to the at least one brake module. At least one brake actuator of the electrical parking brake is activated by the brake module in response to the parking request signal. The motor vehicle can be, for example, an electric vehicle, a hybrid electric vehicle, or a plug-in hybrid electric vehicle. The motor vehicle can be a passenger vehicle or a utility vehicle.

In examples disclosed herein, the drive control module can, in response to (a) receiving or generating the parking request signal or (b) receiving or generating an error signal indicating a failure of the braking module, activate at least one brake actuator of the parking brake. In examples disclosed herein, the drive control module activates at least one brake actuator of the parking brake either independently of the operation or functional status of the brake module or in response to an operational malfunction or a failure of the brake module. In the second-mentioned alternative, the drive control module serves as a safeguard in the case of the failure of the brake module to secure or maintain the motor vehicle in a parked state (i.e., the motor vehicle is at a standstill). In examples disclosed herein, the failure of the brake module includes a failure of an activation of the at least one brake actuator of the parking brake by the brake module, due to which the motor vehicle, without the intervention by the drive control module, would move out of the parked or standstill state under the effect of gravity on an inclined underlying surface. Due to such a failure of the brake module, the braking force generated by the at least one brake actuator activated by the brake module would not be adequate to secure the motor vehicle in the parked state.

In examples disclosed herein, because the drive control module facilitates securing of the motor vehicle in the parked state, a parking pawl can be omitted from the manufacture of the motor vehicle. The omission of the parking pawl results in more cost-effective production of the motor vehicle and reduces the weight of the motor vehicle. In particular, the drive control module is already included in the motor vehicle to control the electric drive and, thus, the use of the drive control module in connection with the electric parking brake decreases the overall complexity of the motor vehicle.

In example motor vehicles disclosed herein, the electric drive includes at least one central electric motor associated with at least two wheels of the motor vehicle. In some examples, the electric drive includes at least two or four wheel-proximal electric motors, each associated with a single wheel of the motor vehicle. In some examples, the electric drive is a part of a hybrid electric drive. In such examples, the drive control module can be a hybrid drivetrain control module.

Example drive control modules disclosed herein receive and process the parking request signal. In some examples, the parking request signal can be generated by another electronic module of the motor vehicle in response to a parking request input received via a manually actuatable selector switch or another type of input unit of the motor vehicle. In other examples, the drive control module can register or detect a parking request input via the manually actuatable selector switch or the other type of input unit of the motor vehicle and, in response, generate the parking request signal associated with the parking request. Example drive control modules disclosed herein include at least one analysis electronics unit to execute software to implement the drive control module.

In some examples disclosed herein, the drive control module of the example motor vehicles disclosed herein receive and process an error signal(s) indicating a failure of the brake module. The error signal(s) can be generated by another (i.e., different) electronic module of the motor vehicle based on signal(s) output by sensor(s) on the respective wheel brake. The sensor data can be used to determine whether the wheel brake or a corresponding brake actuator has been adequately activated to secure the motor vehicle in the parked or standstill state. For instance, sensor(s) of the motor vehicle can detect if the motor vehicle is rolling away from the parked state, which can result in generation of the error signal(s). In some examples, the drive control module can process signal(s) from a corresponding sensor or a corresponding sensor system and evaluate the sensor signal(s) to generate the error signal(s) and activate the at least one brake actuator in response to the error signal(s).

In some examples disclosed herein, the electrical parking brake includes, for example, two wheel brakes arranged on a common wheel axis, each having a brake actuator. The brake module can activate the parking brake after receiving the parking request signal. As a result, the at least one brake actuator is activated and the motor vehicle is secured in the parked or standstill state.

In some examples disclosed herein, at least one registration module is communicatively coupled to the drive control module and the brake module. The registration module registers or detects a parking operation request and generates the parking request signal associated with the parking operation request. Thus, in such examples, the parking request signal is not generated by the drive control module. The registration module can be communicatively coupled to a manually actuatable selector switch or another type of input unit of the motor vehicle to detect a manual parking request at the selector switch or the input unit and to generate an associated parking request signal. In such examples, the registration module includes at least one sensor at the selector switch or the input unit and at least one evaluation electronics unit in communication with the sensor. In some examples, the registration module is at least partially implemented by existing hardware and/or software components of the motor vehicle. In other examples, the registration module is implemented by hardware and/or software separate from the existing hardware and/or software components of the motor vehicle to enable a motor vehicle to be retrofitted with the example registration modules disclosed herein.

In some examples, the parking operation request is registered by the registration module and the parking request signal is generated by the registration module. As disclosed herein, the registration module is in communication with the drive control module and the brake module.

In some examples disclosed herein, the drive control module is communicatively coupled to a brake actuator of the parking brake and the brake module is communicatively coupled to another brake actuator of the parking brake. In this example, in the event of failure of the brake module, the motor vehicle can be held securely in the parked or standstill state based on instructions from the drive control module. Conversely, in the event of failure of the drive control module, the motor vehicle can be held securely in the parked or standstill state based on instructions from the brake module. Thus, the drive control module and the brake module mutually secure one another in the event of failure of the other.

In some examples, the parking brake includes two brake actuators and one brake actuator of the parking brake is activated by the drive control module and the other brake actuator of the parking brake is activated by the brake module.

In some examples disclosed herein, the drive control module generates instructions to cause the parking brake to perform at least one function of the parking brake not associated with a parking operation. For instance, the drive control module can control the parking brake for a hill start assist or can communicate with the brake module to implement a hill start assist function.

Turning to the figures, FIG. 1 is a block diagram of an example motor vehicle 1 in accordance with teachings of this disclosure. The motor vehicle 1 includes an electric drive 14, a drive control module 2 to activate the drive, an electrical parking brake 3, and a brake module 4 to activate the parking brake 3 in response to a parking request signal.

In the example of FIG. 1, the drive control module 2 is a hybrid drivetrain control module. The parking brake 3 has a right brake actuator 5, which is associated with a right rear wheel (not shown) of the motor vehicle 1, and a left brake actuator 6, which is associated with a left rear wheel (not shown) of the motor vehicle 1. The brake actuators 5 and 6 are connected via connections V to the brake module 4.

The brake module 4 is supplied with electrical energy by a main power source 7 via a connection V, wherein the main power source 7 is, for example a 12 V vehicle battery. In this example, the drive control module 2 is supplied with electrical energy by a secondary power source 9 via a connection V, wherein the secondary power source 9 is, for example a 12 V battery.

In the example of FIG. 1, the drive control module 2 and the brake module 4 are communicatively coupled via connections V to a switch 8, via which a request to activate the parking brake 3 can be registered. Also, in the example of FIG. 1, the drive control module 2 is communicatively coupled via a connection V to an operating selector switch 10 of the motor vehicle 1. A parking request can be manually input via the operating selector switch 10.

In FIG. 1, the drive control module 2 is communicatively coupled via a connection V of a CAN bus (not shown) of the motor vehicle 1 to the brake module 4. Furthermore, the drive control module 2 is communicatively coupled via a connection V to a velocity sensor 11. The velocity sensor 11 outputs signal(s) indicative of an instantaneous vehicle velocity. Also, in FIG. 1, the drive control module 2 is communicatively coupled via connections V to the connections V, via which the brake actuators 5 and 6 are connected to the brake module 4.

In the example of FIG. 1, in response to (a) receiving the parking request signal from the operating selector switch 10 or from the switch 8 or (b) receiving or generating an error signal indicating a failure of the brake module 4, the drive control module 2 generates instructions to cause the two brake actuators 5 and 6 of the parking brake 3 to be activated. In some examples, a registration module (not shown) of the operating selector switch 10 or the switch 8 is communicatively coupled connected to the drive control module 2 and the brake module 4. The registration module can register a parking operation request input via the operating selector switch 10 or the switch 8 and generate a parking request signal associated with the parking operation request.

Figure 2:
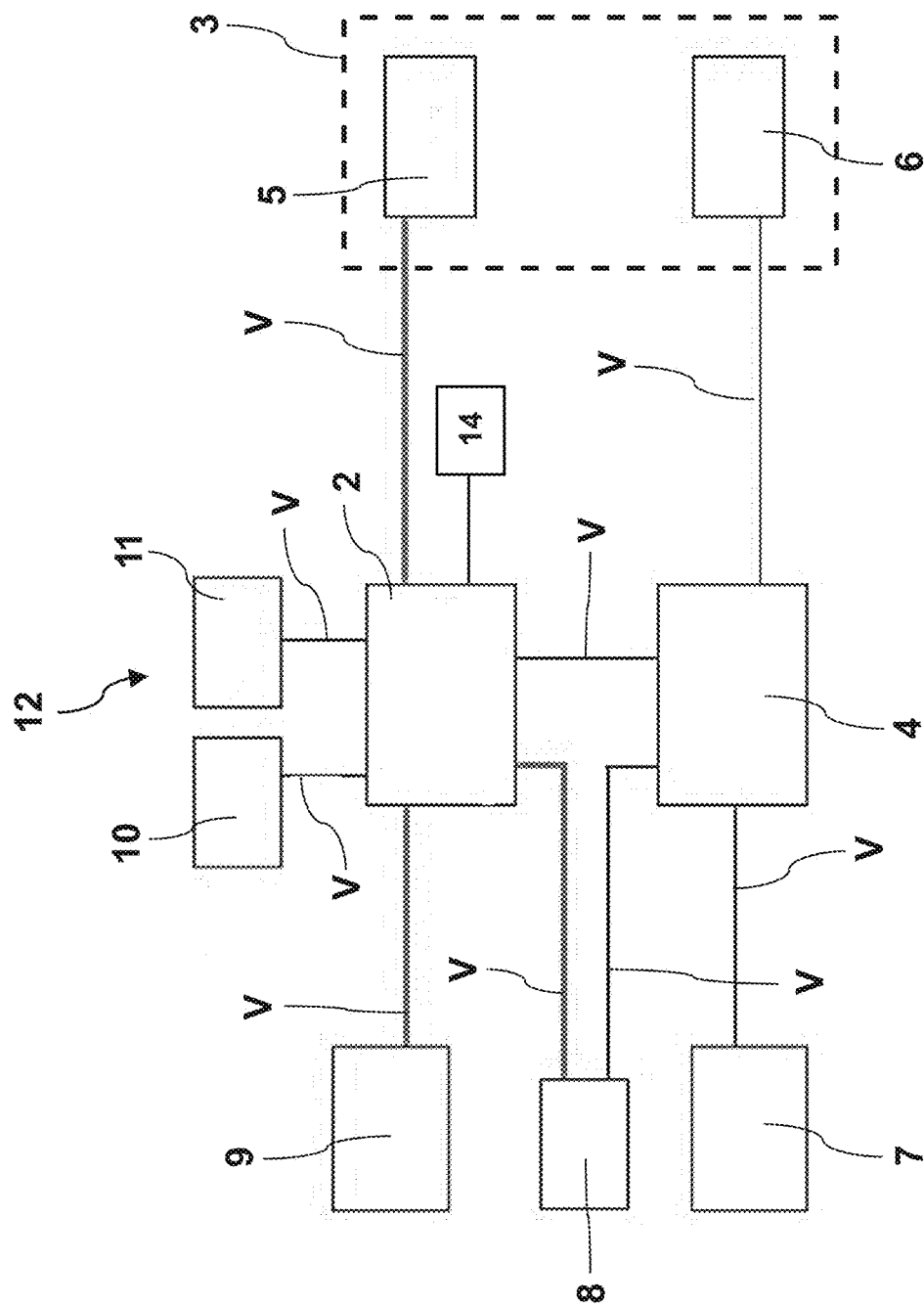
FIG. 2 is a block diagram of another example motor vehicle in accordance with teachings of this disclosure.

FIG. 2 is a block diagram of another example motor vehicle 12 in accordance with teachings of this disclosure. The example motor vehicle 12 of FIG. 2 differs from the example motor vehicle 1 of FIG. 1 in that the drive control module 2 is communicatively coupled via a connection V to the right brake actuator 5 (e.g., the drive control module 2 is only in communication with the right brake actuator 5) and the brake module 4 is communicatively coupled via the connection V to the left brake actuator 6 (e.g., the brake module 4 is only in communication with the left brake actuator 6). In this way, if the parking request signal is present, the right brake actuator 5 is activated by the drive control module 2 and the left brake actuator 6 is activated by the brake module 4.

Figure 3:
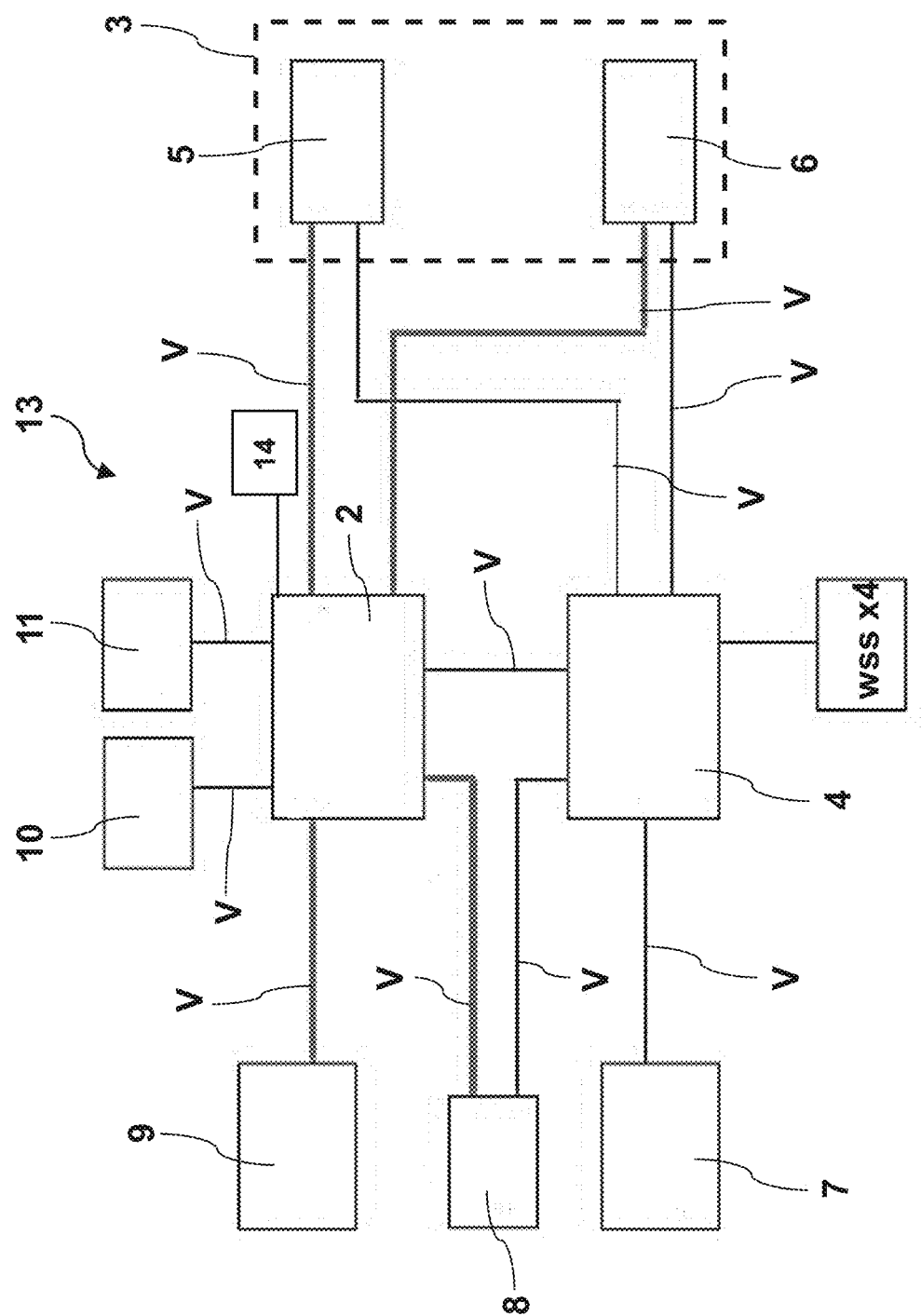
FIG. 3 is a block diagram of another example motor vehicle in accordance with teachings of this disclosure.

FIG. 3 is a block diagram of another example motor vehicle 13 in accordance with teachings of this disclosure. The example motor vehicle 13 of FIG. 3 differs from the example motor vehicle 1 of FIG. 1 in that the drive control module 2 is communicatively coupled via connections V to the brake actuators 5 and 6 (e.g., in direct communication with brake actuators 5, 6). Also, in the example of FIG. 3, the drive control module 2 can activate the parking brake 3 to activate at least one function of the parking brake 3 not associated with a parking operation. Further, a wheel velocity sensor wss x4 is shown in FIG. 3, which is in communication to the brake module 4.

The example drive control module 2 of FIGS. 1, 2, and/or 3 may be implemented by hardware, software, firmware and/or any combination of hardware, software and/or firmware. Thus, for example, the example drive control module 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example drive control module 2 is hereby expressly defined to include a non-transitory computer readable storage device or storage disk such as a memory, a digital versatile disk (DVD), a compact disk (CD), a Blu-ray disk, etc. including the software and/or firmware. Further still, the example the example drive control module 2 may include one or more elements, processes and/or devices in addition to, or instead of, those illustrated in FIGS. 1, 2, and/or 3, and/or may include more than one of any or all of the illustrated elements, processes and devices.

The example brake module 4 of FIGS. 1, 2, and/or 3 may be implemented by hardware, software, firmware and/or any combination of hardware, software and/or firmware. Thus, for example, the example brake module 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example brake module 4 is hereby expressly defined to include a non-transitory computer readable storage device or storage disk such as a memory, a digital versatile disk (DVD), a compact disk (CD), a Blu-ray disk, etc. including the software and/or firmware. Further still, the example the example brake module 4 may include one or more elements, processes and/or devices in addition to, or instead of, those illustrated in FIGS. 1, 2, and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Machine readable instructions disclosed herein may be one or more executable programs or portion(s) of an executable program for execution by a computer processor and/or processor circuitry, such as the processor(s) 412, 512 shown in the example processor platform(s) 400, 500 discussed below in connection with FIGS. 4 and 5. The program(s) may be embodied in software stored on a non-transitory computer readable storage medium such as a CD-ROM, a floppy disk, a hard drive, a DVD, a Blu-ray disk, or a memory associated with the processor(s) 400, 500, but the entire program and/or parts thereof could alternatively be executed by a device other than the processor(s) 400, 500 and/or embodied in firmware or dedicated hardware. Many other methods of implementing the example drive control module 2 and/or the brake module 4 may alternatively be used. For example, the order of execution of the instructions may be changed, and/or some of the instructions described may be changed, eliminated, or combined. Additionally or alternatively, any or all of the instructions may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes disclosed herein may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
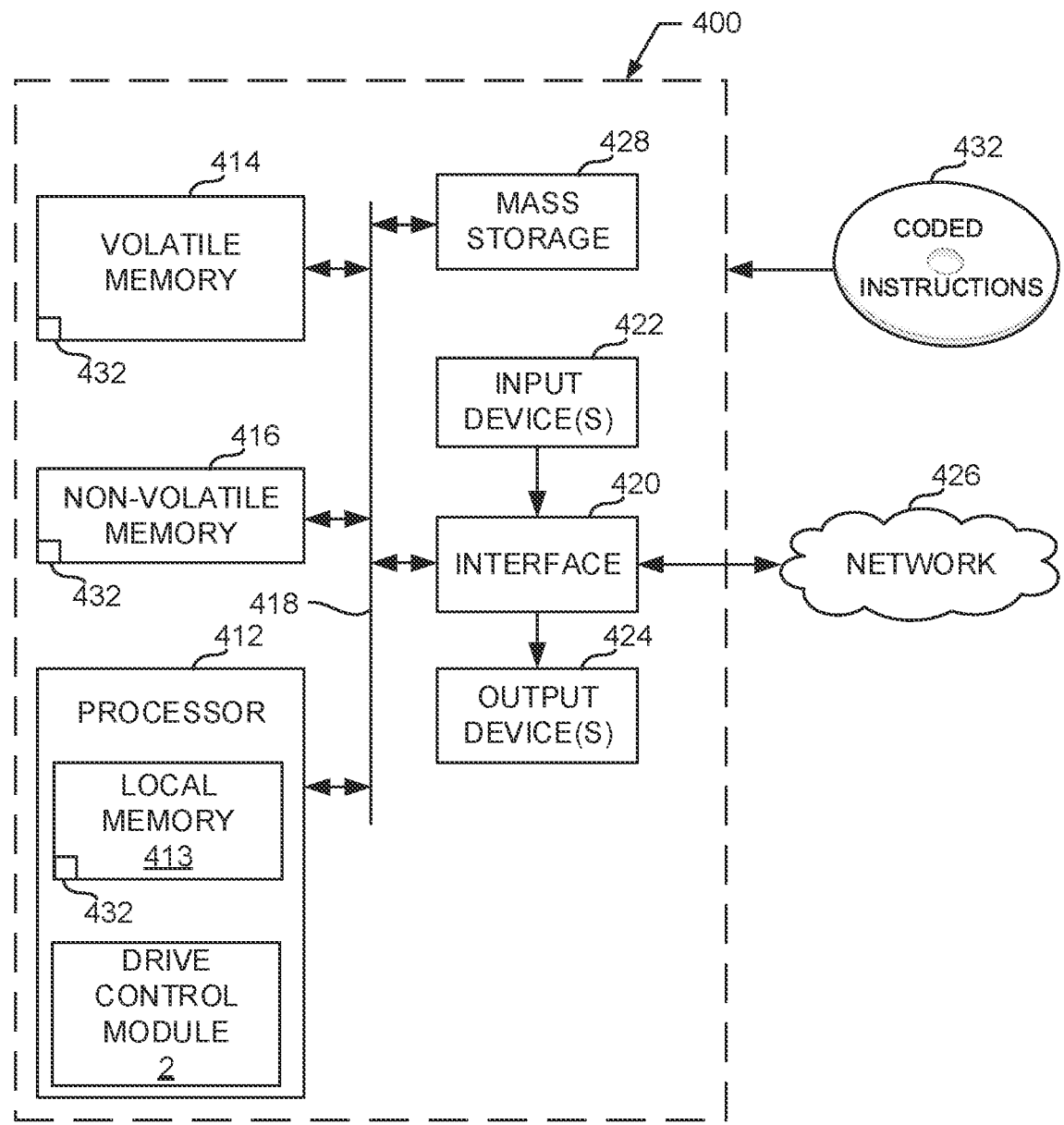
FIG. 4 is a block diagram of an example processing platform structured to execute instructions to implement an drive control module of the example motor vehicles of FIGS. 1, 2, and/or 3.

FIG. 4 is a block diagram of an example processor platform 400 structured to execute instructions to implement the drive control module 2 of FIGS. 1, 2, and/or 3. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

Machine executable instructions 432 may be stored in the mass storage device 428, in the volatile memory 414, in the non-volatile memory 416, and/or on a removable non-transitory computer readable storage medium such as a CD or DVD.

Figure 5:
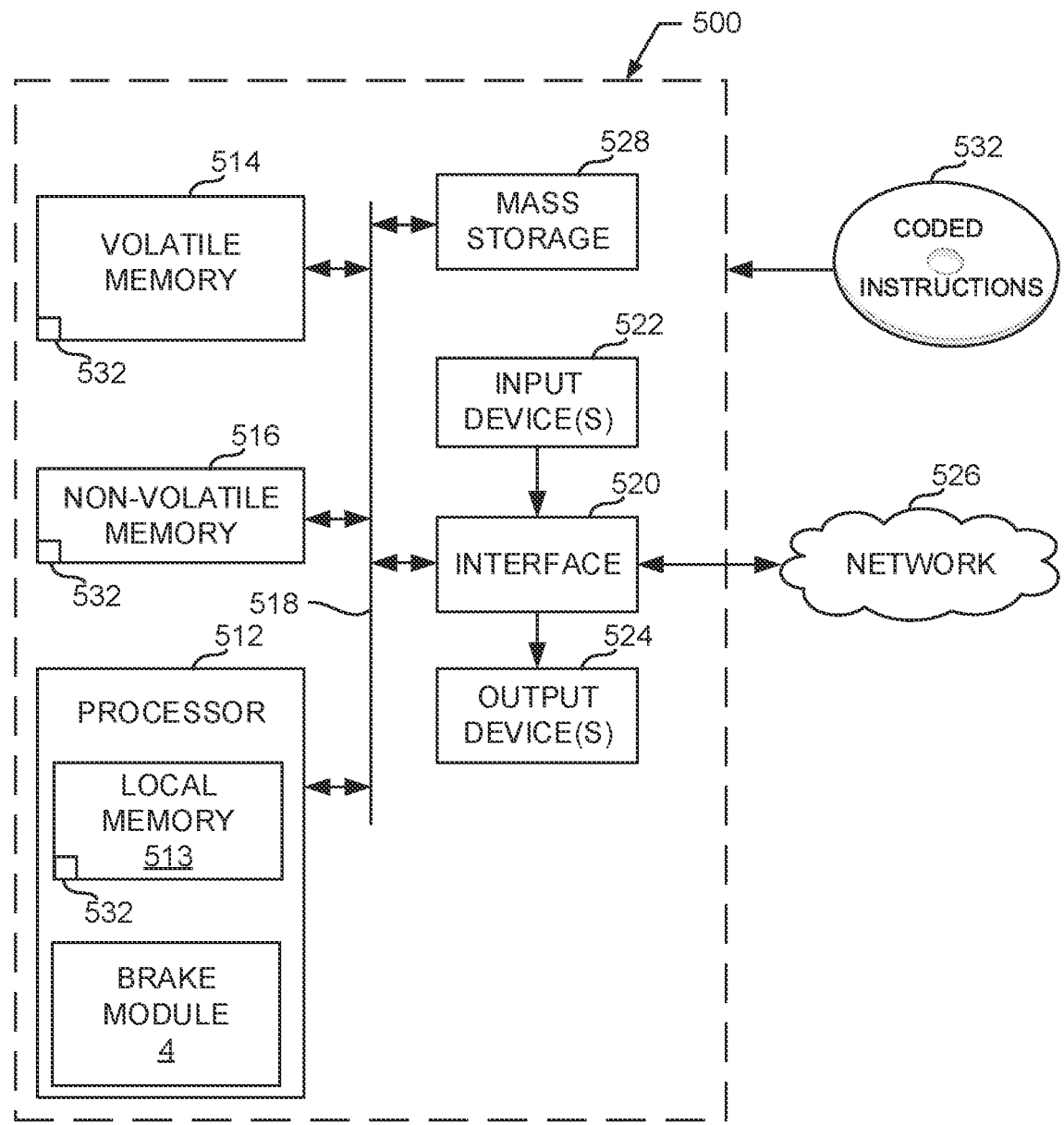
FIG. 5 is a block diagram of an example processing platform structured to execute instructions to implement a brake module of the example motor vehicles of FIGS. 1, 2, and/or 3.

FIG. 5 is a block diagram of an example processor platform 500 structured to execute instructions to implement the brake module 4 of FIGS. 1, 2, and/or 3. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

Machine executable instructions 532 may be stored in the mass storage device 528, in the volatile memory 514, in the non-volatile memory 516, and/or on a removable non-transitory computer readable storage medium such as a CD or DVD.

Example motor vehicles and methods for operating motor vehicles are disclosed herein. Further examples and combinations thereof include the following:

Example 1 includes a motor vehicle including an electric drive; an electrical brake including one or more braking actuators; a drive controller communicatively coupled to the electric drive and the electrical brake; and a brake controller communicatively coupled to the electrical brake. The drive controller is to cause the one or more braking actuators to actuate in response to a signal indicating a failure of the brake controller.

Example 2 includes the motor vehicle of example 1, wherein the electrical brake includes a first braking actuator and a second braking actuator, the drive controller to cause the first braking actuator to actuate and the brake controller to cause the second braking actuator to actuate.

Example 3 includes the motor vehicle of example 1, wherein the electrical brake includes a first braking actuator and a second braking actuator, the drive controller communicatively coupled to the first braking actuator and the second braking actuator and the brake controller communicatively coupled to the first braking actuator and the second braking actuator.

Example 4 includes the motor vehicle of example 1, wherein the signal is a first signal and wherein the drive controller is to cause the one or more braking actuators to actuate in response to a second signal, the second signal indicative of a parking request input received at the motor vehicle.

Example 5 includes the motor vehicle of example 4, further including a switch, the switch to transmit the parking request input to the drive controller.

Example 6 includes the motor vehicle of example 1, wherein the signal is a first signal and wherein the drive controller is to actuate the one or more braking actuators in response to a second signal, the second signal indicative of a hill start assist request input for the motor vehicle.

Example 7 includes the motor vehicle of example 1, wherein the brake controller is to cause the one or more brake actuators to actuate in response to a signal indicating a failure of the drive controller.

Example 8 includes a motor vehicle including an electrical drive; an electrical brake; a drive controller in communication with electrical drive to generate a first instruction to cause the electrical drive to actuate; and a brake controller, each of the drive controller and the brake controller in communication with the electrical brake, the drive controller to selectively generate a second instruction to cause the electrical brake to actuate.

Example 9 includes the motor vehicle of example 8, further including a first switch to detect a first parking request input for the motor vehicle, the drive controller and the brake controller in communication with the first switch.

Example 10 includes the motor vehicle of example 9, further including a second switch to detect a second parking request input for the motor vehicle, the drive controller in communication with the second switch.

Example 11 includes the motor vehicle of example 10, wherein the drive controller is to generate the second instruction in response to the detection of the first parking request input at the first switch or the second parking request input at the second switch.

Example 12 includes the motor vehicle of example 8, wherein the drive controller is to generate the second instruction in response to notification of a failure event at the brake controller.

Example 13 includes the motor vehicle of example 8, further including a first power source to provide power to the drive controller and a second power source to provide power to the brake controller.

Example 14 includes the motor vehicle of example 8, wherein the electrical brake includes a first actuator and a second actuator, the drive controller communicatively coupled to the first actuator and the second actuator and the brake controller communicatively coupled to the first actuator and the second actuator.

Example 15 includes the motor vehicle of example 8, wherein the electrical brake includes a first actuator and a second actuator, the drive controller to generate the second instruction to cause the first actuator to actuate and the brake controller to generate a third instruction to cause the second actuator to actuate.

Example 16 includes a method including causing, via an electrical drive controller of a motor vehicle, an electrical drive of the motor vehicle to actuate; and causing, via the electrical drive controller, an electrical brake of the motor vehicle to actuate in response to a signal output by a sensor of the motor vehicle, the signal indicative of a failure event at a brake controller of the motor vehicle.

Example 17 includes the method of example 16, wherein the causing of the electrical brake to actuate includes transmitting an instruction to at least one of a first braking actuator or a second braking actuator of the electrical brake.

Example 18 includes the method of example 16, further including: detecting a parking request input received at the motor vehicle and causing, via the electrical drive controller, the electrical brake to actuate in response to the detection of the parking request input.

Example 19 includes the method of example 16, further including detecting a hill start assist request input received at the motor vehicle; and causing, via the electrical drive controller, the electrical brake to actuate in response to the detection of the hill start assist request input.

Example 20 includes the method of example 16, further including detecting, at the electrical drive controller, the failure event based on the signal output by the sensor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A motor vehicle comprising:
an electric drive;
an electrical brake including one or more braking actuators;
a drive controller communicatively coupled to the electric drive and the electrical brake; and
a brake controller communicatively coupled to the electrical brake, the drive controller to transmit instructions to the one or more braking actuators to cause the one or more braking actuators to actuate in response to a signal, the signal indicating a failure of the brake controller to activate at least of one of the one or more braking actuators, the drive controller to transmit the instructions via a first communication pathway and a second communication pathway, the second communication pathway defined between the braking controller and the one or more braking actuators, the first communication pathway defined between the drive controller and the second communication pathway and bypassing the braking controller.

2. The motor vehicle of claim 1, wherein the signal is a first signal and wherein the drive controller is to cause the one or more braking actuators to actuate in response to a second signal, the second signal indicative of a parking request input received at the motor vehicle.

3. The motor vehicle of claim 2, further including a switch, the switch to transmit the parking request input to the drive controller.

4. The motor vehicle of claim 1, wherein the electrical brake includes a first braking actuator and a second braking actuator, the drive controller to cause the first braking actuator to actuate and the brake controller to cause the second braking actuator to actuate.

5. The motor vehicle of claim 1, wherein the electrical brake includes a first braking actuator and a second braking actuator, the drive controller communicatively coupled to the first braking actuator and the second braking actuator and the brake controller communicatively coupled to the first braking actuator and the second braking actuator.

6. The motor vehicle of claim 1, wherein the signal is a first signal and wherein the drive controller is to actuate the one or more braking actuators in response to a second signal, the second signal indicative of a hill start assist request input for the motor vehicle.

7. The motor vehicle of claim 1, wherein the brake controller is to cause the one or more brake actuators to actuate in response to a signal indicating a failure of the drive controller.

8. A motor vehicle comprising:
an electrical drive;
an electrical brake;
a drive controller in communication with the electrical drive to generate a first instruction to cause the electrical drive to actuate; and
a brake controller, each of the drive controller and the brake controller in communication with the electrical brake via a shared communication pathway, a first portion of the shared communication pathway extending from the brake controller to the electrical brake, a second portion of the shared communication pathway extending from the drive controller and bypassing the brake controller, the second portion communicatively coupled to the first portion of the shared communication pathway at a location along the first portion of the shared communication pathway between the brake controller and the electrical brake, the drive controller to selectively generate a second instruction to cause the electrical brake to actuate and transmit the second instruction via the shared communication pathway.

9. The motor vehicle of claim 8, further including a first switch, the drive controller and the brake controller in communication with the first switch to detect a first parking request input for the motor vehicle.

10. The motor vehicle of claim 9, further including a second switch, the drive controller in communication with the second switch to detect a second parking request input for the vehicle.

11. The motor vehicle of claim 10, wherein the drive controller is to generate a third instruction in response to the detection of the first parking request input at the first switch or the second parking request input at the second switch.

12. The motor vehicle of claim 8, wherein the drive controller is to generate the second instruction in response to notification of a failure event at the brake controller.

13. The motor vehicle of claim 8, further including a first power source to provide power to the drive controller and a second power source to provide power to the brake controller.

14. The motor vehicle of claim 8, wherein the electrical brake includes a first actuator and a second actuator, the drive controller communicatively coupled to the first actuator and the second actuator and the brake controller communicatively coupled to the first actuator and the second actuator.

15. The motor vehicle of claim 8, wherein the electrical brake includes a first actuator and a second actuator, the drive controller to generate a third instruction to cause the first actuator to actuate and the brake controller to generate a fourth instruction to cause the second actuator to actuate.

16. A method comprising:
causing, via an electrical drive controller of a motor vehicle, an electrical drive of the motor vehicle to actuate;
detecting, based on a signal output by a sensor of the motor vehicle, a failure event at a brake controller of the motor vehicle; and
causing, by an instruction transmitted by the electrical drive controller via a first connection communicatively coupled to a second connection, an electrical brake of the motor vehicle to actuate in response to the detection of the failure event, the first connection extending from the electrical drive controller and bypassing the brake controller, the second connection extending between the brake controller and the electrical brake of the motor vehicle.

17. The method of claim 16, wherein the causing of the electrical brake to actuate includes transmitting the instruction to at least one of a first braking actuator or a second braking actuator of the electrical brake.

18. The method of claim 16, further including:
detecting a parking request input received at the motor vehicle; and
causing, via the electrical drive controller, the electrical brake to actuate in response to the detection of the parking request input.

19. The method of claim 16, further including:
detecting a hill start assist request input received at the motor vehicle; and
causing, via the electrical drive controller, the electrical brake to actuate in response to the detection of the hill start assist request input.

\* \* \* \* \*